United States Patent Office 3,415,847
Patented Dec. 10, 1968

3,415,847
FLUOROCARBON ORTHOESTERS
Richard L. Talbott, Ramsey, Minn., assignor to Minnesota Mining and Manufacturing Company, St. Paul, Minn., a corporation of Delaware
No Drawing. Filed Oct. 18, 1965, Ser. No. 500,488
2 Claims. (Cl. 260—340.7)

This invention relates to new esters and particularly to a new class of organic orthoesters which are substantially free from hydrogen and are highly or completely substituted by fluorine.

The formation of orthoesters of aliphatic acids is described, for example, by H. W. Post, The Chemistry of Aliphatic Orthoesters, Reinhold Publishing Corp., New York, 1943. Such esters will be recognized, at least formally, as polyesters derived from aliphatic acids in the ortho form and one or more alcohols. The hydroxyl groups in a polyol, e.g., a glycol, triol, etc., may in some examples serve as the alcohol moieties. The aliphatic acids may be the simple unsubstituted alkanoic acids or alkandioic acids or their derivatives, or may be substituted by one or more haloid groups. The term haloid is here employed to embrace the halogens fluorine, chlorine, bromine, iodine, and cyano inasmuch as it is well known that in certain respects the cyano group resembles a halogen atom. Suitable orthoesters include the esters of acetic, propionic, butyric, formic, chloroacetic, valeric, hexanoic, 4-methylpentanoic, 2-methylpentanoic, trichloroacetic, trifluoroacetic, bromoacetic, iodoacetic, bromopropionic, carbonic and oxalic acids. Orthoesters of benzoic acid and other aromatic acids are also known.

The alcohol precursors of an orthoester may be the simple unsubstituted alkanols or polyols or they may be substituted on carbon atoms other than the carbons bearing the hydroxyl groups. Phenols may also yield orthoesters. Some exemplary orthoesters are shown in Table I together with references to procedures for their preparation.

TABLE I

| | Reference to procedure |
|---|---|
| $CF_3C\begin{matrix}-OCH_2\\-OCH_2\\-OCH_2\end{matrix}C-CH_3$ | I. R. A. Barnes, G. Doyle, and J. A. Hoffman, J. Org. Chem., 27, 90 (1962). |
| $CCl_3C\begin{matrix}-OCH_2\\-OCH_2\\-OCH_2\end{matrix}C-CH_3$ | |
| $HC\begin{matrix}-OCH_2\\-OCH_2\\-OCH_2\end{matrix}C-CH_3$ | II. W. V. E. Doering and L. K. Levy, J. Am. Chem. Soc., 75, 509 (1955). |
| $CCl_3C\begin{matrix}-OCH_3\\-OCH_2\\-OCH_2\end{matrix}$ | III. Meerwein and Sonke, Ber., 64, 2375 (1931); idem, J. Prakt. Chem. 137, 295 (1933). |
| $HC(OCH_2CH_2F)_3$ | IV. Redemann, et al., J. Am. Chem. Soc., 70, 3604 (1948). |
| $[HCF_2(CF_2)_5CH_2O]_4C$<br>$[HCF_2(CF_2)_5CH_2O]_3CH$<br>$[HCF_2(CF_2)_3CH_2O]_4C$<br>$[HCF_2CF_2CH_2O]_4C$<br>$[ClCF_2CH_2O]_4C$<br>$[HCF_2(CF_2)_3CH_2O]_3CH$ | V. M. E. Hill, D. T. Carty, D. Oegg, J. C. Butler and A. F. Stang, J. Org. Chem., 30, 411 (1965). |
| $CF_3C(OCH_3)_3$ | VI. T. Holm, U.S. 2,611,787 (1952). |

So far as is known heretofore available orthoesters of aliphatic alcohols have hydrogen atoms bonded to the carbon atoms bonded to oxygen in the alkoxyl group. These orthoesters have been found to be susceptible to oxidation and in general to be readily hydrolyzed by dilute aqueous acids.

It is one object of this invention to provide orthoesters which have enhanced stability to dilute acids.

It is a further object of this invention to provide orthoesters which are free from hydrogen atoms on the carbon atoms bonded to the oxygen atoms of the orthoester group.

A yet further object of this invention is to provide orthoesters which have enhanced stability to oxidation over those which were heretofore available.

An even further object of this invention is to provide orthoesters of 1,1-difluoroalkanols.

Other objects of this invention will become evident from the disclosure hereinafter.

In accordance with the above and other objects of the invention it has been found that organic orthoesters derived from aliphatic acids of 1 to 14 carbon atoms and aliphatic primary alkanols or polyols of 1 to 8 carbon atoms are fluorinated by elemental fluorine so that all 1,1-dihydroalkoxyl groups are converted to 1,1-difluoroalkoxyl groups. It has been found further that the resulting orthoesters not only have greater stability to dilute acids than those not subjected to fluorination, but also that the process provides a new and novel class of fluorinated compounds useful as thermally and oxidatively stable, and chemically inert fluids. The new class of organic compounds is collectively termed tris(1,1-difluoroalkyl) orthoesters of aliphatic acids. These compounds are characterized as being substantially free from hydrogen and highly or completely substituted by fluorine.

These orthoesters are represented by the general formula:

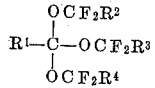

wherein $R^1CO_2H$ is the formal parent acid and $R^2CF_2OH$, $R^3CF_2OH$, and $R^4CF_2OH$ are the formal parent alkanols of the compounds of the invention and $R^1$, $R^2$, $R^3$ and $R^4$ are defined as below. $R^2$, $R^3$ and $R^4$ are individually the same or different and may be interconnected.

The term tris(1,1-difluoroalkyl) orthoesters includes orthoesters of both monobasic acids and polybasic acids with 1,1-difluoroalkanols, although it is not believed that any 1,1-difluoroalkanols are presently known as such at ordinary temperatures. Both tris(1,1-difluoroalkyl) and tetrakis(1,1-difluoroalkyl) orthoesters of carbonic acid are embodiments of the invention.

The acids $R^1CO_2H$ are characterized as being aliphatic acids substantially free from hydrogen atoms linked to carbon and containing from one to about fourteen carbon atoms. The acids may be linear or, in some cases, branched or cyclic or interrupted by heteroatoms such as oxygen, nitrogen and the like. Substituents selected from the group of haloids and the nitro group may be present on the aliphatic chain. Acids of the type $R^1CO_2H$, some of which may be unknown as the free acids, include oxalic acid, difluorocyanoacetic acid, trifluoroacetic acid, chlorodifluoroacetic acid, trichloroacetic acid, difluoronitroacetic acid, fluoroformic acid, perfluorobutyric acid, difluoromalonic acid, perfluoromyristic acid, perfluorocyclohexanecarboxylic acid, perfluoro-n-hexanoic acid, perfluoro-α-methylbutyric acid, perfluoroadipic acid, fluorodibromoacetic acid, carbonic acid, and 2-bromo-3-chloroperfluoropropionic acid.

In the special case of tetrakis(1,1-difluoroalkyl) orthocarbonates $R^1$ is a 1,1-difluoroalkoxyl group $R^5CF_2O$—, where $R^5$ is defined as $R^2$, $R^3$ and $R^4$ are defined hereinafter.

The 1,1-difluoroalkanols $R^2CF_2OH$, $R^3CF_2OH$ and $R^4CF_2OH$ which are the formal parent moieties of the compounds of the invention are comprised of less than 1 percent hydrogen by weight linked to carbon and may contain from one to about eight carbon atoms. The number of carbon atoms may be equal to or less than the corresponding number of carbon atoms in the alcohol moieties of the orthoester used as starting material in the process of the invention. Generally the difluoroalkanols are not obtainable from the orthoesters by ordinary processes and their individual properties are therefore unknown.

In general, these fluorinated alkanols are linear or branched, and contain one or more substituents from the group of nitro groups and haloids or the carbon chains are interrupted by heteroatoms such as oxygen, nitrogen, and the like, accordingly as the original alkanol was so substituted. Other than one hydrogen atom which may be retained on the terminal carbon atom of the carbon chains, other carbon atoms of the chains are substantially free from hydrogen. The 1,1-difluoroalkanols may be derived from simple alkanols, diols or triols and the orthoesters may thus be acyclic or cyclic. For example, the compound:

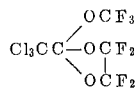

will be seen to be the monocyclic orthoester of trichloroacetic acid with perfluoromethanol and perfluoroethylene glycol.

The orthoester of trifluoroacetic acid and the trifunctional 1,1 - difluoroalkanol, tris(hydroxydifluoromethyl)nitromethane, is the polycyclic compound

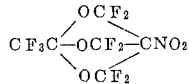

which is named systematically as 4 - nitro-1-trifluoromethyl-2,6,7-trioxaperfluorobicyclo[2.2.2]octane.

Examples of representative 1,1-difluoroalkanols include perfluoromethanol, perfluoroethanol, perfluoroethylene glycol, perfluoropropylene glycol, 1,1,1 - tris(hydroxydifluoromethyl)perfluoroethane, tris(hydroxydifluoromethyl)nitromethane, perfluoro - n-heptanol, ω-hydroperfluoro - n - heptanol, 2-chloroperfluoroethanol, 2-bromoperfluoroethanol, ω-hydroperfluoropropanol, 2,2,2-trichloroperfluoroethanol, and the like.

A preferred class of the orthoesters of the invention is more particularly represented by the formula

wherein Q is the same as $R^1$ in $R^1CO_2H$ as defined herein and $(R)_3$ is from 1 to 3 R groups selected individually to have a total valence of three from the group consisting of fluorine, perfluoroalkyl of 1 to 7 carbon atoms, perfluoroalkylene represented by $(CF_2)_n$ where $n$ is 0 to 6 and isomers thereof, perfluoroalkylidene of 2 to 6 carbon atoms, and perfluoroalkenenyl of 1 to 5 carbon atoms. In this description the term alkenenvl is used, by analogy to phenenyl, for a trivalent aliphatic radical in preference to the term alkenyl provided by Hackh's Chemical Dictionary, 3rd ed., which in normal usage refers to an unsaturated monovalent alkyl radical and might therefore cause confusion. It will be seen that a methine radical sometimes called methenyl radical, viz. HC≡, is the lowest member of this series.

The compounds of the invention range in properties from volatile liquids to oils and waxy or crystalline solids. They are normally colorless but may be colored due to the presence of chromogenic groups.

Broadly speaking, the process of the invention comprises subjecting an orthoester containing 1,1-dihydroalkoxyl groups as part of the orthoester group (such as 4 - methyl - 1-trifluoromethyl-2,6,7-trioxabicyclo[2.2.2]octane) to the action of elemental fluorine, at a temperature in the range of from about −100° to +100° C., for a time sufficient to introduce into the reaction mixture at least the stoichiometric amount of fluorine necessary to convert all 1,1 - dihydroalkoxyl groups to 1,1-difluoroalkoxyl groups. Lesser amounts of fluorine may be used if desired, but lower yields of the desired product will be produced. The time required to carry out the process varies from about 10 minutes to 6 to 12 hours and upwards, depending on the amount of starting material charged and the ease with which the fluorination is accomplished.

The desired products are isolated from the reaction mixtures by fractional condensation, employing traps cooled with ice-salt mixtures, Dry Ice, liquid air, and the like. where the products are low-boiling and other appropriate temperature conditions where higher boiling liquids or solids are produced. The fluorine and other gases used are conveniently introduced under slight positive pressure. Preferably, the fluorine is diluted with nitrogen or other inert gas such as argon, helium, a Freon, such as dichlorodifluoromethane, or the like to give concentrations upward of about 0.1 percent; but 100 percent fluorine in the gas stream, that is undiluted fluorine, can be used in many of the procedures described, using great caution and slow addition.

Residual fluorine should always be flushed out of the reactants and the apparatus, using dry nitrogen or the like, to avoid unpleasant and toxic exposure to fluorine as well as untoward effects owing to the strong oxidizing power of this substance. The apparatus used is preferably constructed from Monel metal, nickel, brass, stainless steel, or copper. Solid, liquid, or gaseous starting materials can be used. The reactant is placed in a suitable container with diluents or suspending media if desired, and fluorine is then introduced for a period ranging from about 10 minutes to about 6 to 12 hours and upwards, depending on the amount of starting material charged and the ease with which the fluorination is accomplished.

Generally speaking, once the process has gone to completion, no further fluorine reacts so that when the products are volatile and thus are swept into the traps, continuation of the flow of fluorine is not deleterious; but in the case of non-volatile solid or non-volatile liquid products excessive exposure to fluorine should be avoided to eliminate the possibility that degradative reactions may occur.

An inert liquid suspending medium can be used to suspend the finely divided oxygen-containing reactant, and the fluorine gas with or without a diluent gas is then bubbled through the suspension. Inert solid diluents, such as finely divided sodium fluoride, can also be used. Thus, for example, fluorine-inert liquids such as perfluorinated hydrocarbons, e.g., perfluorooctanes, perfluorohexanes, and the like; perfluorocyclohexane; perfluorinated cyclic ethers such as perfluorobutylfuran; perfluorinated tertiary amines such as tris-perfluoro-n-butylamine; and the like can be used. Commercially obtainable fluorocarbons may contain an amount of material which is not inert toward fluorine, and in such cases, fluorine gas is passed through the selected fluorocarbon liquid for a time in small amounts just sufficient to render it substantially completely inert toward fluorine. When an inert liquid diluent is employed in the process of the invention, the fluorinated reaction product generally dissolves in the diluent. In a similar manner, inert gases can be used as diluents for gaseous reactants.

In the procedure where no solvent is used, the effluent gas stream ordinarily contains the products, which are separated by traps as stated. Where solvent is employed, any insoluble material is removed by filtration and the product is recovered by evaporation of the solvent, preferably under reduced pressure. Fractionation may be necessary if separation of the products is desired. It should be noted that for some purposes, the reaction product mixture can be used as such. Further separation of the products of reaction is accomplished by chromatographic techniques in small scale runs; in larger runs, other known methods of fractionation such as distillation and liquid column chromatography, can be used.

The compounds of the invention are useful as thermally stable, oxidatively stable, and chemically inert fluids. These compounds are particularly useful as alkali-resistant and acid-resistant fluids, inasmuch as continued exposure to strong alkaline or acidic conditions does not effect the orthoester group in these compounds.

Having thus described my invention broadly, it is now more specifically illustrated by the following examples in which parts are by weight.

EXAMPLE 1

The fluorination of 4-methyl-1-trifluoromethyl-2,6,7-trioxabicyclo[2.2.2]octane (M.P. 152.5°–3.5° C. rather than 145° C. as reported by Barnes et al. J. Org. Chem., vol. 27, p. 90 (1962)) is carried out by placing a suspension of 1.0 g. of this material (5.1 millimoles) in 75 ml. of perfluorotributylamine in a sealable 25 cm. cylindrical Monel tube, 2.5 cm. in diameter, having a sintered disk near the bottom, a gas inlet tube below the disk, and a gas outlet tube near the top. The tube is sealed, cooled to about 0° C., and flushed for 1 hour with a stream of dry prepurified nitrogen. Fluorine gas (>95 percent purity) is then admitted into the nitrogen stream (all connections being Monel metal) which is passed into the vessel via the sintered disk. The volatile, entrained products formed are recovered from the effluent stream in a trap immersed in liquid air after passage through an iron tube containing granular sodium fluoride at room temperature to remove hydrogen fluoride. A stream of about 2.3 percent (by volume) fluorine in nitrogen is passed through the reactor at a flow-rate of about 0.566 liter per minute for one hour. Thereafter, concentrations and flow rates are altered, the temperature remaining at about 0° C., as follows:

| Time Range (Hours from start) | $F_2$ Concentration (percent by volume) | Flow Rate (Cu. ft. per min.) |
|---|---|---|
| 1-2 | 12.4 | 0.0085 |
| 2-4 | 14.8 | 0.014 |
| 4-6 | 25.0 | 0.004 |

A total of 0.43 mole of fluorine is used. The fluorine flow is then discontinued and the cooling bath removed. The reaction vessel is then purged with nitrogen for two hours to remove fluorine and to carry the products of the reaction into the liquid air trap.

After removal of the most volatile materials under a pressure of about 0.1 mm. of mercury, at liquid air temperature (chiefly $F_2$ and $N_2$), the residue in the trap is purified by fractional distillation-condensation on a vacuum line at less than 1 mm. pressure employing traps designated A, B, and C, cooled, respectively, to −5° C., −78° C. and −196° C. The contents of traps A and C are of no interest. Trap B contains about 0.3 ml. of liquid which is further purified by vapor phase chromatography, employing a column 2 meters in length and 0.5 inch in diameter packed with poly(chlorotrifluoroethylene) oil (33 percent) coated on 30–60 mesh acid-washed diatomaceous earth (67 percent) and maintained at about 70° C. Helium is used as a carrier gas at a flow rate of about 150 ml. per minute at atmospheric pressure and an 8-volt thermistor is used as a detector. 1,4-bis(trifluoromethyl)-2,6,7-trioxaperfluorobicyclo[2.2.2]octane is obtained as a colorless liquid having a vapor pressure at about 25° C. of 53 mm. of mercury. The yield of pure material thus obtained is about 10 percent of the theoretical amount based on the amount of 4-methyl-1-trifluoromethyl-2,6,7-trioxabicyclo[2.2.2]octane used as starting material.

*Analysis.*—Calculated for $C_7F_{12}O_3$: 23.3% C; 63.3% F; M.W. 360. Found: 22.6% C; 60.9 F; M.W. 350.

(Compounds containing high concentrations of $CF_3$ groups are often incompletely burned on analysis due to the formation of $CF_4$ in the combustion process, which does not undergo complete combustion at 1200° C. under the conditions of the analysis.)

The structural formula is further supported by the $F^{19}$ nuclear magnetic resonance (N.M.R.) spectrum and the mass cracking pattern. The N.M.R. spectrum (in $CFCl_3$ solution) contains a singlet absorption at +84.8ϕ (assigned to the $CF_3$ group next to the carbon atom linked to three oxygen atoms), a fourfold absorption at +70.3ϕ (assigned to the six fluorines of the $CF_2$ groups) and a sevenfold absorption at +62.3ϕ (assigned to the remaining $CF_3$ group). The coupling constant is 9.3 cycles per second. The area ratios of the peaks are consistent with the structural assignment. The mass cracking pattern shows fragments attributable to $C_4F_7^+$ (m/e=181), $CF_3^+$ (m/e=69, largest peak), and the parent structure lacking one fluorine atom (e.g., $C_7F_{11}O_3^+$, m/e=341), in addition to many other peaks consistent with the structure. No peaks attributable to fragments containing hydrogen are observed. The $F^{19}$ N.M.R. spectrum of the starting material exhibits a single resonance peak, which is a singlet at +84.9ϕ (at 95° C. in benzene with benzotrifluoride as internal reference). The proton N.M.R. spectrum shows two resonance peaks, both singlets, at +6.38τ and at +9.73τ (at 70° C. in benzene and benzotrifluoride with tetramethylsilane as internal reference). The former absorption is assigned to the methylene hydrogens, while the latter is assigned to the methyl group hydrogens. These two peaks appear at +6.04τ and at +9.12τ respectively when carbon tetrachloride is used as solvent at +25° C.

1,4 - bis(trifluoromethyl) - 2,6,7-trioxaperfluorobicyclo-[2.2.2.]octane may be washed with water or aqueous sodium carbonate solution with no evidence of hydrolysis. Treatment of this compound with acid solutions ranging in strength up to 95 percent sulfuric acid at temperatures up to 125° C. for periods of time up to one hour gives no evidence of any reaction. The compound is insoluble in water, but readily soluble in fluorinated solvents, and in common non-polar organic solvents.

EXAMPLE 2

The polycyclic orthoester of trichloroacetic acid and 2-hydroxymethyl-2-methyl-1,3-propanediol, M.P. 217–219° C., is prepared substantially as described by Barnes et al., loc. cit. and fluorinated by the procedure of Example 1, employing perfluorobutylfuran as the fluorination solvent rather than perfluorotributylamine. The reaction products are separated by careful distillation of the reaction mixture followed by vapor phase chromatography of various fractions using a column such as the column described in Example 1 to give 1-trichloromethyl-4 - trifluoromethyl-2,6,7-trioxaperfluorobicyclo[2.2.2]octane, which is identified by its $F^{19}$ N.M.R. spectrum and its mass cracking pattern.

The following tabulation of examples shows the products obtained from further orthoesters by following the fluorination workup and characterization procedures set forth in greater detail in Examples 1 and 2 above. The procedures by which the various orthoesters are prepared are indicated by the Roman numerals of Table I.

TABLE II

| Example | Orthoester | Preparation Procedure Reference | Products |
|---|---|---|---|
| 3 | Cl₃C—C(OCH₃)(OCH₂)(OCH₂) (cyclic) | III | Cl₃C—C(OCF₃)(OCF₂)(OCF₂) (cyclic) |
| 4 | CF₃C(OCH₃)₃ | VI | CF₃C(OCF₃)₃ |
| 5 | (ClCF₂CH₂O)₄C | V | (ClCF₂—CF₂O)₄C |
| 6 | [HCF₂(CF₂)₅CH₂O]₃CH | V | [F(CF₂)₇O]₃CF and [H(CF₂)₇O]₃CF |
| 7 | HC(OCH₂)(OCH₂)—C—CH₃ with OCH₃ | II | FC(OCF₂)(OCF₂)—C—CF₃ with OCF₃ |
| 8 | HC(OCH₂CH₂F)₃ | IV | FC(OCF₂CF₃)₃ |
| 9 | [HCF₂(CF₂)₅CH₂O]₄C | V | [CF₃(CF₂)₆O]₄C and [HCF₂(CF₂)₆O]₄C |
| 10 | [HCF₂(CF₂)₃CH₂O]₃CH | V | [CF₃(CF₂)₄O]₃CF and [HCF₂(CF₂)₄O]₃CF |
| 11 | [HCF₂CF₂CH₂O]₄C | V | [CF₃CF₂CF₂O]₄C and [HCF₂CF₂CF₂O]₄C |
| 12 | CF₃C(OCH₂)(OCH₂)—C—NO₂ with OCH₃ | I | CF₃C(OCF₂)(OCF₂)—C—NO₂ with OCF₂ |
| 13 | NCCF₂C(OCH₃)₃ | VI | NCCF₂C(OCF₃)₃ |
| 14 | ClCF₂C(OCH₃)₃ | VI | ClCF₂C(OCF₃)₃ |
| 15 | O₂NCF₂C(O—CH₂)(O—CH₂)(O—CH₂)CCH₃ | I | O₂NCF₂C(OCF₂)(OCF₂)(OCF₂)CCF₃ |
| 16 | CF₃(CF₂)₁₂C(OCH₂)(OCH₂)(OCH₂)CCH₃ | I | CF₃(CF₂)₁₂C(OCF₂)(OCF₂)(OCF₂)CCF₃ |
| 17 | CFBr₂C(OCH₂)(OCH₂)(OCH₂)CCH₃ | I | FCBr₂C(OCF₂)(OCF₂)(OCF₂)CCF₃ |
| 18 | (perfluorocyclohexyl)C(OCH₂)(OCH₂)(OCH₂)CCH₃ | I | (perfluorocyclohexyl)C(OCF₂)(OCF₂)(OCF₂)CCF₃ with F |
| 19 | CF₃CFC(OCH₂)(OCH₂)(OCH₂)CCH₃ with OCF₃ | I | CF₃CFC(OCF₂)(OCF₂)(OCF₂)CCF₃ with OCF₃, OCF₃ |

What is claimed is:

1. An orthoester represented by the formula

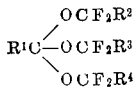

wherein R¹ is selected from the group consisting of fluorine, perfluoroalkoxy containing 1 to 8 carbon atoms, perfluoroalkyl containing from one to fourteen carbon atoms, chlorodifluoromethyl, cyanodifluoromethyl, nitrodifluoromethyl, dibromofluoromethyl, trichloromethyl and perfluorocyclohexyl and wherein R²[CF₂OH], R³[CF₂OH] and R⁴[CF₂OH] individually are perfluoroalkyl containing from one to eight carbon atoms or fluorine, wherein any two together are a simple bond in a five-membered ring and wherein R², R³ and R⁴ all taken together are a trivalent group selected from the group of:

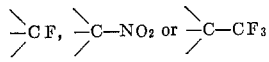

2. 1,4-bis(trifluoromethyl)-2,6,7 - trioxaperfluorobicyclo[2.2.2]octane.

References Cited

UNITED STATES PATENTS 2,570,435  10/1957  Downing et al. _____ 23—288
3,006,727  10/1961  Ruh et al. _____ 23—153

OTHER REFERENCES

Emeleus et al.: Advances in Inorganic Chemistry, vol. 3, 1961, page 406.

Barnes et al.: J. Org. Chem., vol. 27 (1962), pp. 90–93.

Senning: Chemical Reviews, vol. 65, pp. 393–4 (1965).

NICHOLAS S. RIZZO, *Primary Examiner.*

J. H. TURNIPSEED, *Assistant Examiner.*

U.S. Cl. X.R.

260—340.9, 465.6, 615